United States Patent [19]

Chmiel

[11] Patent Number: 5,017,853
[45] Date of Patent: May 21, 1991

[54] SPIKELESS MOTOR STARTING CIRCUIT

[75] Inventor: Steven F. Chmiel, Milwaukee, Wis.

[73] Assignee: Rexnord Corporation, Milwaukee, Wis.

[21] Appl. No.: 485,952

[22] Filed: Feb. 27, 1990

[51] Int. Cl.$^5$ .............................................. H02P 1/44
[52] U.S. Cl. ..................... 318/786; 318/794; 318/817; 318/778
[58] Field of Search .............. 318/751, 752, 778, 779, 318/780, 781, 785, 786, 787, 792, 793, 794, 795, 796, 817

[56] References Cited

U.S. PATENT DOCUMENTS

| | | | |
|---|---|---|---|
| 2,549,265 | 4/1951 | Trant | 318/751 |
| 4,604,563 | 8/1986 | Min | 318/786 |
| 4,622,506 | 11/1986 | Shemanske et al. | 318/786 |
| 4,658,195 | 4/1987 | Min | 318/786 |
| 4,670,697 | 6/1987 | Wrege et al. | 318/786 |
| 4,687,982 | 8/1987 | Palaniappan | 318/763 |
| 4,719,399 | 1/1988 | Wrege | 318/786 |
| 4,745,347 | 5/1988 | Wrege et al. | 318/744 |
| 4,751,449 | 6/1988 | Chmiel | 318/786 |
| 4,751,450 | 6/1988 | Lorenz et al. | 318/786 |
| 4,782,278 | 11/1988 | Bossi et al. | 318/786 |
| 4,786,850 | 11/1988 | Chmiel | 318/786 |
| 4,843,295 | 6/1989 | Thompson et al. | 318/779 |

*Primary Examiner*—William M. Shoop, Jr.
*Assistant Examiner*—John W. Cabeca
*Attorney, Agent, or Firm*—Andrus, Sceales, Starke & Sawall

[57] ABSTRACT

A capacitor-start capacitor-run single phase AC induction motor control starting circuit is provided which minimizes first cycle current spiking magnitude, and also minimizes cycle to cycle current spiking magnitude, without a choke or inductor in the loop containing the run capacitor, start capacitor and start switch. The first cycle current spiking problem is solved by controlling when the start switch may be turned on at initiation of the starting mode in relation to the AC cycle, to permit turn-on of the start switch only within a known or predictable range of voltage differential between the run and start capacitors. The cycle to cycle current spiking problem is solved by proper phasing of gate current, and supplying gate current to the start switch in phase with the voltage across the run capacitor and out of phase with the current through the series connected start switch and start capacitor.

16 Claims, 2 Drawing Sheets

SPIKELESS MOTOR STARTING CIRCUIT

BACKGROUND AND SUMMARY

The invention relates to disconnect switches for use with the start or auxiliary winding of a capacitor-start capacitor-run single phase AC induction motor.

The invention relates to continuing development efforts and improvements over the circuitry shown in Bossi et al U.S. Pat. No. 4,782,278, assigned to the assignee of the present invention, and incorporated herein by reference. The invention also arose from continuing development efforts relating to U.S. Pat. Nos. 4,604,563, 4,622,506, 4,658,195, 4,687,982, 4,670,697, 4,745,347, 4,751,449, 4,751,450, 4,782,278 and 4,786,850, also assigned to the assignee of the present invention.

A capacitor-start capacitor-run single phase AC induction motor is subject to a phenomenon known as "first cycle current spiking", and to another phenomenon known as "cycle to cycle current spiking". The first cycle current spiking is experienced in both mechanical and solid state disconnect switches.

The present invention addresses and solves the first cycle current spiking problem, and also addresses and solves the cycle to cycle current spiking problem.

As is known in the prior art, a single phase AC induction motor has a main winding and an auxiliary winding both connectable to an AC power source. A start capacitor provides a phase shifted field for starting torque. A semiconductor power switch automatically connects and disconnects the start capacitor to and from the AC source in starting and running modes, respectively. The gate current for the semiconductor power switch is derived through a resistor, such as resistor 72 in the above noted Bossi et al patent, connected to a node common to the start capacitor and a main terminal of the power switch. This circuitry performs admirably on capacitor start or split phase motors. However, when applied to capacitor-start capacitor-run motors, a gate circuit of this type is subject to the above noted first cycle current spiking and cycle to cycle current spiking.

One solution to current spiking known in the prior art is to provide a choke for the run capacitor, such as a large inductance or coil connected in series with the run capacitor or an extended winding. The choke is undesirable because it is massive and expensive. Furthermore, the choke does not solve the first cycle current spiking problem. The choke does reduce the current spike, but not enough to be satisfactory. Another disadvantage of the choke is that it requires the insertion of an element in series with the run capacitor, which is costly from a manufacturing standpoint. Another disadvantage of the choke is that it is in the circuit continuously.

The present invention provides a solution which is particularly simple and effective, and eliminates the need for a separate series connected choke.

The present invention solves the first cycle current spiking problem by controlling when, in relation to the AC cycle, the power switch is allowed to turn on, rather than just allowing the power switch to turn on at random during any point in the AC cycle upon initiation of the starting mode. Instead, the start switch may be turned on only within a known or predictable range of voltage differential between the run and start capacitors.

The present invention solves the cycle to cycle current spiking problem by controlling phasing of gate current to the start switch to be in phase with the voltage across the run capacitor and out of phase with the current through the series connected start switch and start capacitor.

DETAILED DESCRIPTION

As known in the prior art, a single phase AC induction motor has a main winding for running the motor, and a start or auxiliary winding together with the run winding for starting the motor. The start circuit is energized when starting the motor from rest and then disconnected at a given motor speed. The fields in the main and auxiliary windings are phase shifted, for example by capacitance, inductance, resistance or the like, to establish a rotating magnetic field for starting and/or running torque.

Figure 1:
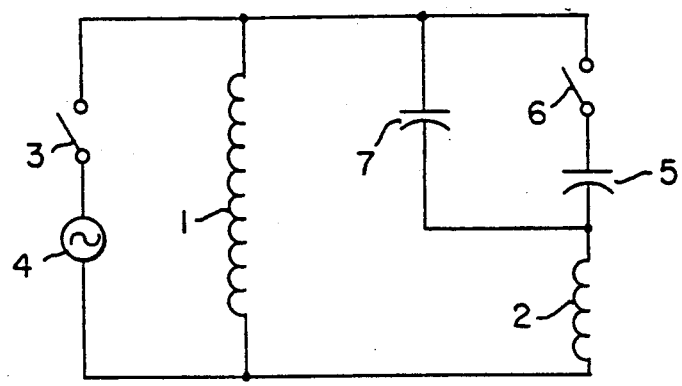
FIG. 1 schematically shows a typical environment in which the preferred embodiment of the present invention is used.

FIG. 1 shows a main winding 1 and auxiliary winding 2 connectable through a main switch 3 to an AC power source 4. Capacitors 5 and 7 provide the phase shift for starting torque. When the motor reaches a given threshold cut-out speed, switch 6 is opened to disconnect start capacitor 5 from AC power source 4. Capacitor 7 is a run capacitor and provides phase shift for running torque.

Figure 2:
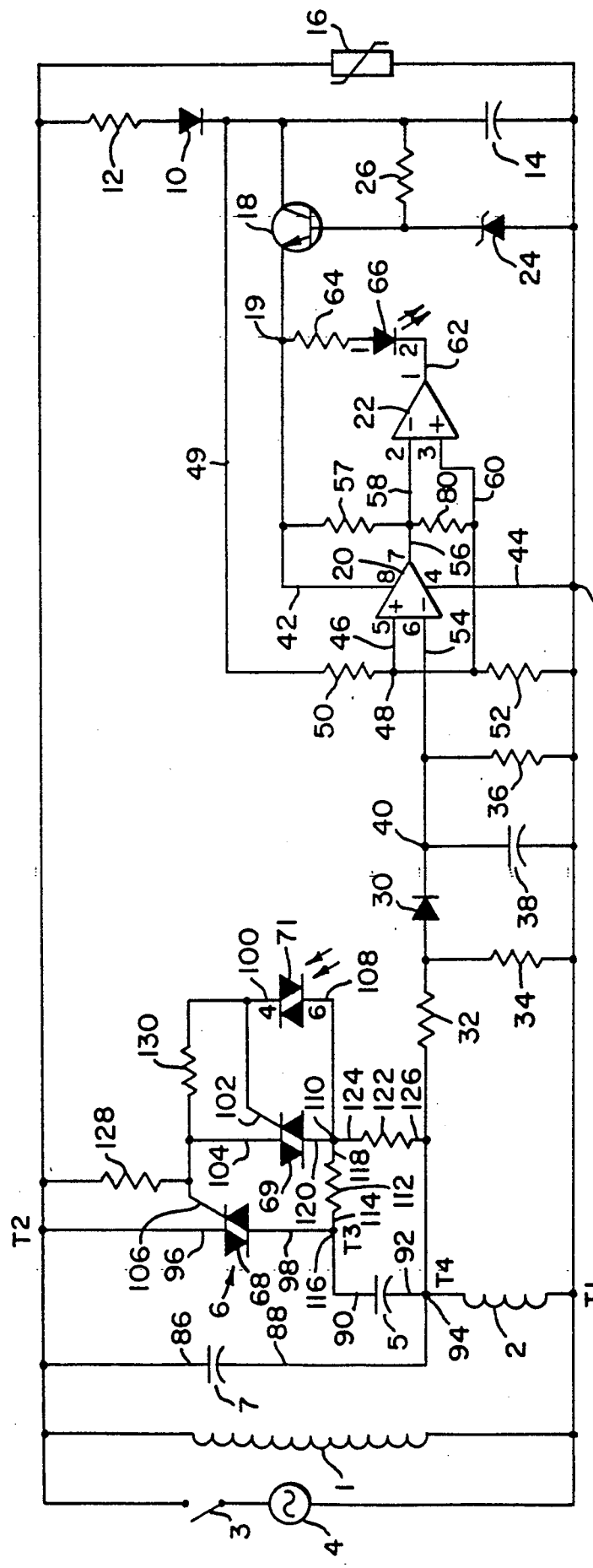
FIG. 2 is a circuit diagram illustrating circuitry constructed in accordance with the invention.

FIG. 2 shows circuitry for controlling start switch 6. A main voltage detector circuit including diode 10 is connected across AC source 4 for sensing the input AC line reference voltage. Voltage from AC source 4 is sensed through resistor 12 and half wave rectifying diode 10, and filtered by a capacitor 14. Varistor 16 provides transient spike protection. An NPN bipolar pass transistor 18 has its emitter-collector circuit connected between the cathode of diode 10 and node 19 which provides a DC power supply for a pair of comparators 20 and 22, to be described. The base circuit of transistor 18 includes a zener diode 24 applying a limited voltage from AC source 4 through diode 10 to the base of transistor 18 to bias the latter into conduction. Base drive current is supplied through resistor 26.

An auxiliary voltage detector circuit including diode 30 is connected across auxiliary winding 2 for sensing auxiliary winding voltage. The auxiliary winding voltage is reduced by the voltage divider network provided by resistors 32 and 34 and sensed through half wave rectifying diode 30 and resistor 36 and filtered by capacitor 38, to provide sensed auxiliary winding voltage at node 40.

Voltage comparators 20 and 22 are provided by a dual comparator integrated circuit, provided by an LM393 integrated circuit, where manufacturer assigned pin number designations are shown to facilitate understanding, having power supply voltage provided at line 42 from node 19, and are connected by line 44 to a common reference at 53. Non-inverting input 46 of comparator 20 senses voltage from AC source 4 at node 48 as reduced by the voltage divider network provided by resistors 50 and 52 from line 49 connected to the cathode of diode 10, to provide floating line compensation. Inverting input 54 of comparator 20 senses auxiliary winding voltage at node 40. Comparator 20 compares the auxiliary winding voltage against the voltage from AC source 4. When the auxiliary winding voltage increases as a function of motor speed to a predetermined cut-out value relative to the voltage at node 48 from AC source 4, comparator 20 outputs a turn-off signal at output 56 causing switch 6 to open and disconnect start capacitor 5 from AC source 4, to be described. When the auxiliary winding voltage decreases as a function of motor speed to a predetermined cut-in value relative to the voltage at node 48, comparator 20 outputs a turn-on signal at output 56 causing switch 6 to close and connect start capacitor 5 to AC source 4. The predetermined cut-in value corresponds to a voltage derived from rotationally induced voltage in the auxiliary winding during overload or stall of the motor after starting.

At initial energization of the motor, the scaled down auxiliary winding voltage at node 40 is substantially smaller than the scaled down main winding voltage at node 48, and hence the voltage at comparator input 54 is less than that at comparator input 46, and thus comparator output 56 is high, as referenced through pull-up resistor 57 to node 19. Comparator output 56 is connected to inverting input 58 of comparator 22. When comparator output 56 is high, comparator output 62 is low, which enables conduction from node 19 through resistor 64 and light emitting diode 66, which turns on switch 6 if certain conditions are met, to be described.

Switch 6 is an optically triggered semiconductor power switch, including a power triac 68, a pilot triac 69, and a light responsive element provided by a light responsive triac 71. LED 66 and light responsive element 71 are provided by a Motorola MOC3063 integrated circuit, and manufacturer assigned pin number designations are shown to facilitate understanding. LED 66 and light responsive element 71 may alternatively be provided by a Siemens IL410 integrated circuit, or the equivalent. LED 66 is optically coupled to light responsive element 71 to optically drive the latter into conduction if the voltage thereacross at pins 4 and 6, at respective terminals 100 and 108, is below a given maximum level. Conduction of light responsive element 71 supplies gate current to pilot triac 69 to trigger the latter into conduction which in turn supplies gate current to triac 68 to trigger the latter into conduction. Upon conduction of triac 68, current flows from AC source 4 through start capacitor 5 and combines with the run capacitor current through auxiliary winding 2.

As motor speed increases, the sensed auxiliary winding voltage at node 40 increases. At a given cut-out value, the voltage at comparator input 54 increases as a function of motor speed above that at comparator input 46. Comparator output 56 then goes low, which low state is supplied to comparator input 58, which in turn causes comparator output 62 to go high. The high state at comparator output 62 disables conduction through LED 66, which terminates the emission of light to light responsive element 71 such that the latter turns off, which in turn removes the gate drive from pilot triac 69 and power triac 68, such that the latter turns off. Turn-off of triac 68 disconnects start capacitor 5 from AC source 4.

Comparator output 56 is connected through resistor 80 to comparator input 46 at node 48. When comparator output 56 goes low at the noted cut-out speed, the voltage at comparator input 46 is reduced through the connection provided by resistor 80, i.e. the voltage at input 46 is pulled low by its connection through resistor 80 to low output 56. Output 56 is now at approximately the same potential as reference 53. The voltage at comparator input 46 is modified because resistor 80 is now effectively in parallel with resistor 52. Comparator output 56 will not transition high again until the auxiliary winding voltage at input 54 decreases below the lowered and modified selected reference voltage at input 46. Comparator output 56 then goes high again, to turn on start switch 6, under given conditions to be described, and reconnect start capacitor 5 to AC source 4. The connection through resistor 80 provides hysteresis such that the cut-in speed is always lower than the cut-out speed.

The connection through resistor 80 changes the voltage at comparator input 46 according to the voltage at comparator output 56 such that the auxiliary winding voltage at comparator input 54 is compared against different voltages at comparator input 46. A lower comparison reference voltage is provided at input 46 when output 56 is low and outputting a turn-off signal because resistor 80 is now effectively in parallel with resistor 52. A higher comparison reference voltage is provided at input 46 when output 56 is high and providing a turn-on signal. Auxiliary winding voltage must decrease to a cut-in value established by the new voltage divider ratio of resistors 50, 52 and 80 which is less than the cut-out value, whereupon comparator output 56 changes states to output a turn-on signal to comparator 22 to reconnect start capacitor 5 to AC source 4.

Resistor 80 is connected between comparator inputs 58 and 60 and provides a voltage drop therebetween. Comparator input 60 is connected to node 48. When comparator output 56 is low, the voltage from AC source 4 at node 48 is dropped across resistor 80 in parallel with resistor 52 to low output 56, and the voltage at comparator input 60 is higher than that at comparator input 58. When comparator output 56 is high, the voltage at output 56 is dropped across resistor 80 to node 48 and through resistor 52 to common reference 53, and the voltage at comparator input 58 is higher than that at comparator input 60.

Run capacitor 7 has first and second terminals 86 and 88. Start capacitor 5 has first and second terminals 90 and 92. Terminals 88 and 92 are connected to each other at a common node 94 at terminal T4. Start winding 2 has one side connected to terminal T4 at node 94 and the other side connected to AC source 4 at terminal T1. Terminal 86 f run capacitor 7 is connected at terminal T2 to the first main terminal 96 of power triac 68. Terminal 90 of start capacitor 5 is connected at terminal T3 to the second main terminal 98 of power triac 68. Light responsive element 71 has a first main terminal 100 connected through gate terminal 102 and main terminal 104 of pilot triac 69 to gate terminal 106 of power triac 68. Light responsive element 71 has a second terminal 108 connected to node 110. Resistor 112 has a first terminal 114 connected at node 116 to terminal 90 of start capacitor 5 and to main terminal 98 of power traic 68. Resistor 112 has a second terminal 118 connected at node 110 to terminal 108 of light responsive element 71 and to main terminal 120 of pilot traic 69. Resistor 122 has a first terminal 124 connected to node 110, and a second terminal 126 connected to node 94 common to terminals 88 and 92 of run and start capacitors 7 and 5. Resistor 128 is connected between gate terminal 106 and main terminal 96 for providing improved dv/dt capability of power triac 68, as known in the art. Resistor 130 is connected between gate terminal 102 and main terminal 104 for providing improved dv/dt capability of pilot triac 69, as known in the art.

The capacitor-start capacitor-run single phase AC induction motor thus has a main winding 1 and an auxiliary winding 2 connected to an AC power source 4, a run capacitor 7 for providing a phase shifted field for starting and running torque, a start capacitor 5 for providing a phase shifted field for starting torque, a start switch 6 for automatically connecting and disconnecting start capacitor 5 to and from AC source 4 in starting and running modes, respectively. Run capacitor 7 and start capacitor 5 are connected in parallel in the starting mode such that during the first cycle of AC source 4 upon initiation of the starting mode, there is an equalization of capacitor voltages if there is charge remaining on the capacitors from the previous running mode. Due to this equalization of capacitor voltages, there is an exchange of current between capacitors 7 and 5, resulting in current flow through the loop including capacitors 7 and 5 and start switch 6. This current flow may reach a high peak current spike if there is a large magnitude voltage differential between capacitors 7 and 5. If uncontrolled, this current exchange and the resulting potential high peak current spike can damage start switch 6 and/or start capacitor 5. As noted above, prior solutions include the provision of a choke such as a large coil or inductance in series with run capacitor 7, or an extended winding thereof.

The present invention provides a simple, inexpensive solution to the noted first cycle current spike problem. Light responsive element 71 provides an inhibit switch responsive to the magnitude of the voltage differential between run capacitor 7 and start capacitor 5 and preventing start switch 6 from connecting start capacitor 5 to AC source 4 until such magnitude drops below a given maximum level, to reduce the first cycle current spike and reduce damage to and extend the life of start switch 6 and start capacitor 5.

In typical applications, at initial application of power to the motor, start capacitor 5 may have a residual charge of 150 to 200 volts if the motor was immediately re-energized after it was previously energized, while run capacitor 7 may be at an equal voltage of opposite polarity at the moment start switch triac 6 turns on. The resulting current spike under these conditions due to the noted voltage differential and current exchange, referred to as the first cycle current spike, may theoretically reach 1,000 plus peak amperes. A current spike of this magnitude may be nearly instantly destructive to triac 6 due to the severe di/dt stress. This problem is solved by the present invention.

The gate circuit of power triac 68 is connected through light responsive element 71 to the loop containing run and start capacitors 7 and 5 to derive gate current therefrom for gating power triac 68 as controlled by light responsive element 71. Conduction of light responsive element 71 is controlled by light emitting element 66 when the voltage across light responsive element 71, i.e. across terminals 100 and 108, is below a predetermined value. When the voltage across light responsive element 71 is above the predetermined value, light responsive element 71 cannot be optically triggered into conduction, which in turn prevents gate current flow to pilot triac 69 and power triac 68, to prevent conduction of power triac 68, and hence prevent connection of start capacitor 5 to AC source 4 regardless of the condition of light emitting element 66.

Terminal 108 of light responsive element 71 is connected through resistor 112 to start capacitor terminal 90. Terminal 100 of light responsive element 71 is connected through gate terminal 102 of pilot triac 69, main terminal 104 of pilot triac 69, gate terminal 106 of power triac 68, and main terminal 96 of power triac 68 to terminal 86 of run capacitor 7. Resistors 112 and 122 form a voltage divider network which provides a voltage level at terminal 108 of light responsive element 71 proportional to the magnitude of voltage across start capacitor 5. Thus, light responsive element 71 detects the difference in voltage between terminal 86 of run capacitor 7 and terminal 90 of start capacitor 5. If the magnitude of the voltage differential is greater than the noted given maximum level, then light responsive element 71 will remain nonconductive and in an inhibit mode until such time that the voltage differential drops below such level, at which time light responsive element 71 will become conductive if still receiving light from light emitting element 66, which in turn permits gate current flow through gate terminal 102 which triggers pilot triac 69 into conduction which in turn permits gate current flow through gate terminal 106 to trigger power triac 68 into conduction. Hence, turn-on of power triac 68 is accomplished within a known or predictable range of voltage differential of run and start capacitors 7 and 5.

The invention also provides a simple, inexpensive solution to the noted cycle to cycle current spike problem. After initial turn-on during the noted first cycle, power triac 68 needs to be triggered into conduction by gate current from the gate circuit during each half cycle of the AC source following a zero-crossing of current through triac 68. In the prior art, it is typical to derive gate current through a resistor, such as resistor 72 in the noted Bossi et al patent, connected to a node common to the start switch and the start capacitor. This allows the use of a low wattage series limiting resistor such as 72 in Bossi et al because, assuming that the LED 66 is illuminated sufficiently to allow conduction of the light responsive element, as soon as sufficient current flows through resistor 72 to the gate of triac 68, the triac will switch to a conductive state and limit the voltage drop across resistor 72 to a low value. Gate dissipation of triac 68 is also minimized with this approach. This type of circuitry performs admirably on capacitor-start or split phase motors. However, when applied to capacitor-start capacitor-run motors, such circuitry results in the above noted phenomenon of cycle to cycle current spiking. This is because a voltage differential between run and start capacitors 7 and 5 provides a potential voltage source for driving current spikes in the loop including run capacitor 7, triac 68 and start capacitor 5, without any inductance or significant resistance to slow current rise. In contrast, in a capacitor-start motor, without run capacitor 7, the only remaining loop through triac 68 and start capacitor 5 includes auxiliary winding 2, which provides an inductance for modifying the rate of change of current, for reducing the rate of current rise.

In capacitor-start capacitor-run single phase AC induction motors, there is no inductance in the loop including run capacitor 7, triac 68 and start capacitor 5, and hence even a small voltage differential between run capacitor 7 and start capacitor 5 will produce high current. As above noted, one solution known in the prior art to prevent such high current is to provide a choke or inductance in series with run capacitor 7 to retard such current flow. The present invention provides a simpler solution to the cycle to cycle current spike problem, without the expense of a choke or inductance.

Figure 3:
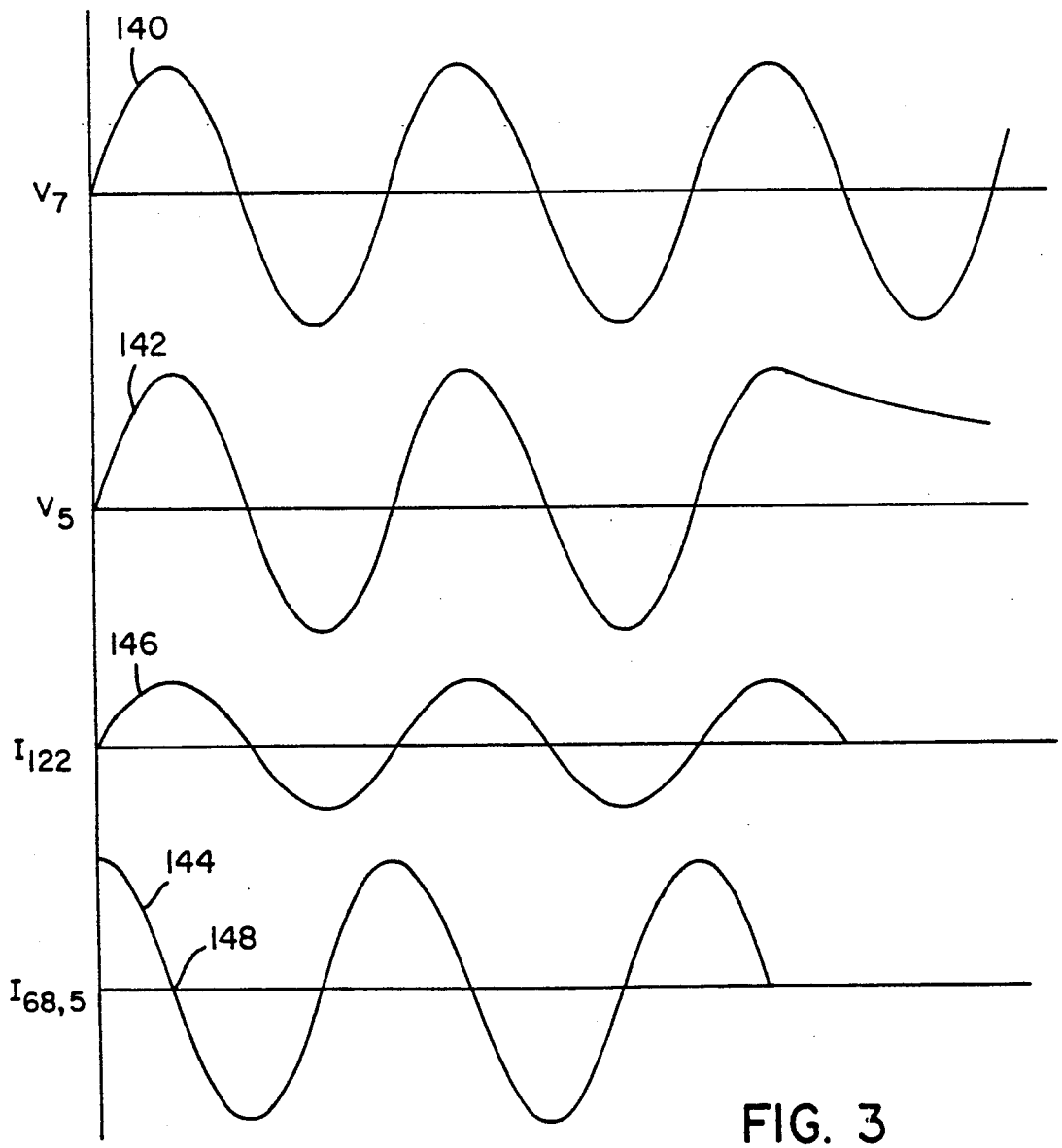
FIG. 3 is a waveform diagram illustrating operation of the invention.

During the starting mode, the voltage across run capacitor 7, as shown at waveform 140 in FIG. 3, is in phase with the voltage across start capacitor 5, as shown at waveform 142. The current through the series connected triac 68 and start capacitor 5, as shown at waveform 144, is 90° out of phase with the voltage across run capacitor 7. In the present invention, gate current, as shown at waveform 146 in FIG. 3, is supplied to the gate circuit of triac 68 in phase with the voltage 140 across run capacitor 7, and 90° out of phase with the current 144 through the series connected triac 68 and start capacitor 5. This is desirable because substantially maximum gate current is supplied to gate terminal 106 of triac 68 at zero-crossing 148 of current 144 through triac 68 and at substantially maximum voltage 140 from the AC source across run capacitor 7. This minimizes turn-on delay of triac 68 following the zero-crossing, to minimize the magnitude of cycle to cycle current spikes and di/dt stress of triac 68 and start capacitor 5.

In contrast, if the gate current supplied to triac 68 is in phase with the current through the series connected triac 68 and start capacitor 5, then there will be a delay in turn-on of triac 68 following the zero-crossing of current therethrough until the gate current which is in phase therewith rises to a sufficient triggering level. The longer the delay, the greater the di/dt stress and the greater the magnitude of the current spikes.

The present invention provides maximum gate current at the very moment it is needed for best performance of triac 68. When the main current through triac 68 between terminals 96 and 98 is going through zero, there is maximum gate current, which in turn provides optimum current spreading in triac 68 to utilize the maximum area of the triac, which minimizes hot spots and current spikes. The proper phasing of the invention applies maximum triggering gate current at minimum main current through the main terminals of the triac. Maximum gate current is supplied to the gate circuit at the zero-crossing of current through the series connected power switch 6 and start capacitor 5, and at substantially maximum voltage from AC source 4 across run capacitor 7, and at substantially maximum voltage from AC source 4 across start capacitor 5, FIG. 3.

The gate to main terminal junction 106 to 96 of triac 68 has a finite current required to cause triac 68 to become conductive through main terminals 96 and 98. Typical triacs require between 20 and 100 milliamperes of gate current to become conductive. In the prior art, a voltage will be developed across the main terminals of the triac such as 68 in Bossi et al prior to each half cycle of conduction and sufficient to cause the required magnitude of gate current to flow through resistor 72 in Bossi et al to the gate of triac 68. The rate of rise of this voltage is dependant on line frequency. At the aforementioned gate current of 20-100 milliamperes, this will result in a voltage drop of 8-40 volts across the triac prior to conduction. During this delay in turn-on of the triac between half cycles of conduction, a run capacitor if present assumes a voltage significantly different from that of the start capacitor 5, since the run capacitor is permanently connected in series with auxiliary winding 2 across the AC source. When the triac becomes conductive, connecting start capacitor 5 in parallel with run capacitor 7, the equalization of capacitor voltages results in a circulating current flow, i.e. a current spike. This current spike may be tens or even hundreds of peak amperes, depending on the voltage difference. Current spiking places severe di/dt stress on triac 68, and may significantly reduce the life of start capacitor 5. As known in the prior art, an inductor may be placed in series with either triac 68 or run capacitor 7 to limit the di/dt stress within this loop. Such inductors are bulky and expensive, and are not as effective at limiting di/dt as the present invention within the realm of practical inductor size.

The present invention provides proper phasing to minimize current spikes. The run capacitor voltage lags start capacitor current by 90°, i.e. reaches a peak value at the instant that start capacitor current is going through zero. The triac gate circuit is essentially resistive, except for insignificant component stray inductance and capacitance. If triac gate current is derived from the junction of the run and start capacitors 7 and 5 at node 94 to gate triac 68 at terminal 106, then such gate current will be in phase with run capacitor voltage 140 and will lag the main current 144 by 90°. This has the effect of minimizing triac turn-on delay and hence minimizing the difference between the start and run capacitor voltages. Cycle to cycle current spiking is thus significantly reduced.

Pilot triac 69 has a lower turn-on gate current requirement and lower holding current than power triac 68. Light responsive element 71 has a lower holding current requirement than pilot triac 69. A presently available light responsive element 71 provided by the noted Motorola MOC3063 integrated circuit is not capable of carrying the 80-90 rms milliamperes of current typically required to gate triac 68, and hence pilot triac 69 is used. Power triac 68, pilot triac 69 and light responsive element 71 all have a high enough dv/dt rating to be operated without a snubber.

Resistors 112 and 122 provide an additional function in that they form a discharge circuit for start capacitor 5, eliminating the need for a customer added bleed resistor as has been employed in the prior art. During the time that triac 68 is on, the potential difference across resistor 112 is very small and a relatively low power resistor may be used. The greatest power dissipation of resistor 112 is during start capacitor discharge. Discharging the start capacitor reduces the voltage stress across triac 68, triac 69 and light responsive element 71 during motor running time.

It is recognized that various equivalents, alternatives and modifications are possible within the scope of the appended claims.

I claim:

1. In a capacitor-start capacitor-run single phase AC induction motor having a main winding and an auxiliary winding both connected to an AC power source, a run capacitor for providing a phase shifted field for starting and running torque, a start capacitor for providing a phase shifted field for starting torque, a start switch for automatically connecting and disconnecting said start capacitor to and from said AC source in starting and running modes, respectively, said run capacitor and said start capacitor being connected in parallel in said starting mode such that during the first cycle of said AC source upon initiation of said starting mode there is an equalization of capacitor voltages and an exchange of current between said run and start capacitors resulting in current flow through a loop including said run and start capacitors and said start switch, which current flow may reach a high peak current spike if there is a large magnitude voltage differential between said run and start capacitors, an inhibit switch responsive to said magnitude of said voltage differential between said run and start capacitors and preventing said start switch from connecting said start capacitor to said AC source until said magnitude drops below a given maximum level, to reduce said first cycle current spike, and reduce damage to and extend the life of said start switch and said start capacitor.

2. The invention according to claim 1 wherein said start switch comprises a semiconductor power switch conductive during said starting mode and nonconductive during said running mode, said power switch having a gate circuit for controlling conduction of said power switch, said inhibit switch comprises a light responsive element in said gate circuit, said gate circuit being connected through said light responsive element to said loop containing said run and start capacitors to derive gate current therefrom for gating said power switch as controlled by said light responsive element, a control circuit providing starting and running mode signals and including a light emitting element optically coupled to said light responsive element for supplying light thereto such that conduction of said light responsive element is controlled by said light emitting element when the voltage across said light responsive element is below a predetermined value, and such that when the voltage across said light responsive element is above said predetermined value said light responsive element prevents gate current flow to said power switch to prevent conduction of said power switch and prevent connection of said start capacitor to said AC source regardless of the condition of said light emitting element.

3. The invention according to claim 2 wherein each of said run capacitor, said start capacitor, and said light responsive element has first and second terminals, said second terminals of said run and start capacitors are coupled to each other at a common node, said second terminal of said light responsive element is coupled to said first terminal of said start capacitor, said first terminal of said light responsive element is coupled to said first terminal of said run capacitor, to sense voltage differential between said run and start capacitors.

4. The invention according to claim 3 comprising a first resistor connecting said second terminal of said light responsive element to said first terminal of said start capacitor, and a second resistor connecting said second terminal of said light responsive element to said second terminal of said start capacitor.

5. The invention according to claim 3 wherein said first terminal of said start capacitor is coupled through a voltage divider to said second terminal of said light responsive element, said voltage divider comprising first and second resistors each having first and second terminals, said first terminal of said first resistor being connected to said first terminal of said start capacitor, said second terminal of said first resistor and said first terminal of said second resistor being connected to each other at a second node, which second node is connected to said second terminal of said light responsive element, said second terminal of said second resistor being connected to said first mentioned node common to said second terminals of said run and start capacitors, said power switch has a first main terminal connected to said first terminal of said run capacitor, said power switch has a second main terminal connected to a third node between said first terminal of said start capacitor and said first terminal of said first resistor, said power switch has a gate terminal connected to said first terminal of said light responsive element.

6. In a capacitor-start capacitor-run single phase AC induction motor having a main winding and an auxiliary winding both connected to an AC power source, a run capacitor for providing a phase shifted field for starting and running torque, a start capacitor for providing a phase shifted field for starting torque, a start switch for automatically connecting and disconnecting said start capacitor to and from said AC source in starting and running modes, respectively, said run capacitor and said start capacitor being connected in parallel in said starting mode, said start switch comprising a semiconductor power switch connected in series with said start capacitor and being conductive during said starting mode and nonconductive during said running mode, said power switch having a gate circuit for controlling conduction thereof, the voltage across said run capacitor during said starting mode being in phase with the voltage across said start capacitor, the current through said series connected power switch and start capacitor being out of phase with said voltage across said run capacitor, said power switch in said starting mode requiring triggering into conduction by gate current from said gate circuit during each half cycle of said AC source following a zero-crossing of current through said series connected power switch and start capacitor, means supplying gate current to said gate circuit in phase with said voltage across said run capacitor and out of phase with said current through said series connected power switch and start capacitor.

7. The invention according to claim 6 wherein said gate current supplying means supplies substantially maximum gate current to said gate circuit at said zero-crossing of current through said series connected power switch and start capacitor, to minimize turn-on delay of said power switch following said zero-crossing, to minimize the magnitude of cycle to cycle current spikes and di/dt stress of said power switch and said start capacitor.

8. The invention according to claim 7 wherein said gate current supply means comprises a circuit connection between said run capacitor and said gate circuit and supplying said gate current from the voltage across said run capacitor such that said gate current is in phase with said voltage across said run capacitor.

9. The invention according to claim 8 wherein each of said run capacitor and said start capacitor has first and second terminals, said power switch has first and second main terminals and a gate terminal, said second terminals of said run and start capacitors are coupled to each other at a common node, said circuit connection of said gate current supplying means comprises a resistor connected between said gate circuit and said common node.

10. The invention according to claim 8 wherein each of said run capacitor and said start capacitor has first and second terminals, said power switch has first and second main terminals and a gate terminal, and comprising first and second resistors each having first and second terminals, said second terminals of said run and start capacitors are connected to each other at a common first node, said first terminal of said run capacitor is connected to said first main terminal of said power switch, said first terminal of said start capacitor is connected to said second main terminal of said power switch, said second terminal of said second resistor is connected to said first node common to said second terminals of said run and start capacitors, said first terminal of said second resistor is connected to said second terminal of said first resistor at a second node which is connected to said gate circuit, said first terminal of said first resistor is connected to a third node between said first terminal of said start capacitor and second main terminal of said power switch.

11. In a capacitor-start capacitor-run single phase AC induction motor having a main winding and an auxiliary winding both connectable to an AC power source, a run capacitor for providing a phase shifted field for starting and running torque, a start capacitor for providing a phase shifted field for starting torque, a start switch for automatically connecting and disconnecting said start capacitor to and from said AC source in starting and running modes, respectively, said run capacitor and said start capacitor being connected in parallel in said starting mode such that during the first cycle of said AC source upon initiation of said starting mode there is an equalization of capacitor voltages and an exchange of current between said run and start capacitors resulting in current flow through a loop including said run and start capacitors and said start switch, which current flow may reach a high peak current spike if there is a large magnitude voltage differential between said run and start capacitors, an inhibit switch responsive to said magnitude of said voltage differential between said run and start capacitors and preventing said start switch from connecting said start capacitor to said AC source until said magnitude drops below a given maximum level, to reduce said first cycle current spike, and reduce damage to and extend the life of said start switch and said start capacitor, said start switch comprising a semiconductor power switch connected in series with said start capacitor and being conductive during said starting mode and nonconductive during said running mode, said power switch having a gate circuit for controlling conduction thereof, the voltage across said run capacitor during said starting mode being in phase with the voltage across said start capacitor, the current through said series connected power switch and start capacitor being out of phase with said voltage across said run capacitor, said power switch in said starting mode requiring triggering into conduction by gate current from said gate circuit during each half cycle of said AC source following a zero-crossing of current through said series connected power switch and start capacitor, means supplying gate current to said gate circuit in phase with said voltage across said run capacitor and out of phase with said current through said series connected power switch and start capacitor.

12. The invention according to claim 11 wherein said gate current supplying means supplies substantially maximum gate current to said gate circuit at said zero-crossing of current through said series connected power switch and start capacitor, to minimize turn-on delay of said power switch following said zero-crossing, to minimize the magnitude of cycle to cycle current spikes and di/dt stress of said power switch and said start capacitor.

13. The invention according to claim 11 wherein said gate current supply means comprises a circuit connection between said run capacitor and said gate circuit and supplying said gate current from the voltage across said run capacitor such that said gate current is in phase with said voltage across said run capacitor.

14. The invention according to claim 13 wherein said inhibit switch comprises a light responsive element in said gate circuit, said gate circuit being connected through said light responsive element to said loop containing said run and start capacitors to derive gate current therefrom for gating said power switch as controlled by said light responsive element, a control circuit providing starting and running mode signals and including a light emitting element optically coupled to said light responsive element for supplying light thereto such that conduction of said light responsive element is controlled by said light emitting element when the voltage across said light responsive element is below a predetermined value, and such that when the voltage across said light responsive element is above said predetermined value said light responsive element prevents gate current flow to said power switch to prevent conduction of said power switch and prevent connection of said start capacitor to said AC source regardless of the condition of said light emitting element.

15. The invention according to claim 14 where each of said run capacitor, said start capacitor, and said light responsive element has first and second terminals, said second terminals of said run and start capacitors are coupled to each other at a common node, said second terminal of said light responsive element is coupled to said first terminal of said start capacitor, said first terminal of said light responsive element is coupled to said first terminal of said run capacitor, to sense voltage differential between said run and start capacitors.

16. The invention according to claim 15 comprising first and second resistors each having first and second terminals, said power switch has first and second main terminals, said first terminal of said run capacitor is connected to said first main terminal of said power switch, said first terminal of said start capacitor is connected to said first terminal of said first resistor, said second terminal of said first resistor is connected to said first terminal of said second resistor at a second node which is connected to said second terminal of said light responsive element, said second terminal of said second resistor is connected to said first node common to said second terminals of said run and start capacitors, said second main terminal of said power switch is connected to a third node between said first terminal of said start capacitor and said first terminal of said first resistor.

* * * * *